March 15, 1960   R. W. ARENGO-JONES   2,928,741
PROCESS FOR THE PRODUCTION OF FRUIT WINES
Filed Sept. 26, 1956
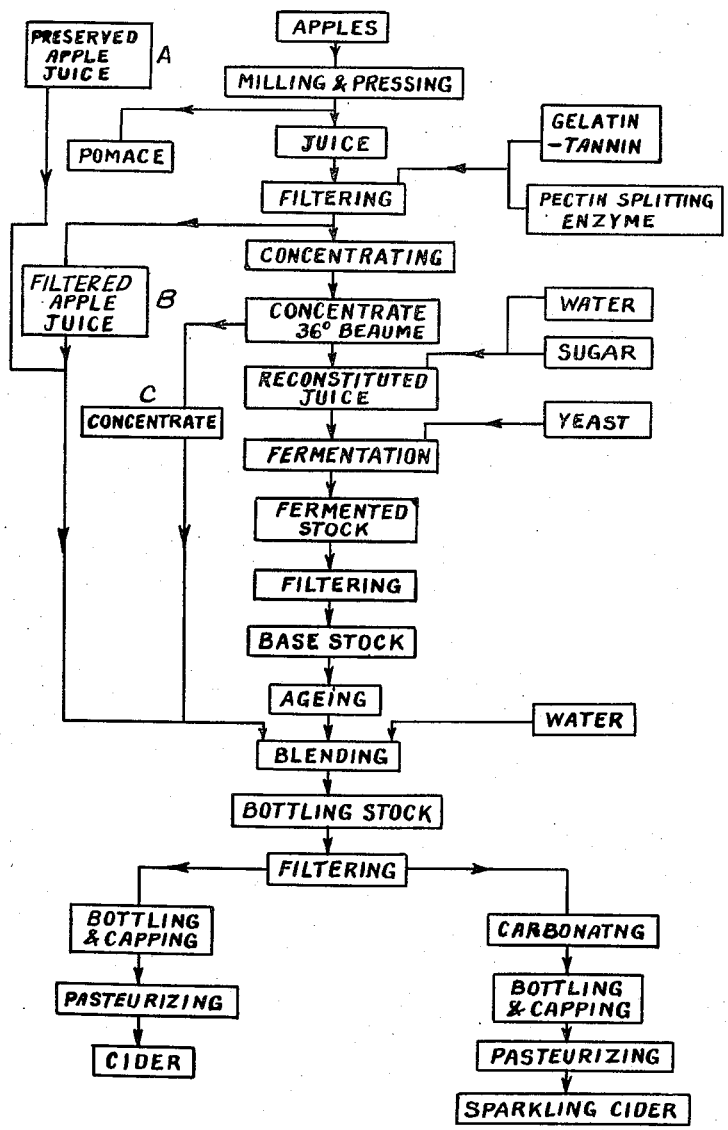
INVENTOR
R. W. Arengo-Jones
By Hetherstonhaugh & Co.
Attorneys

United States Patent Office 2,928,741
Patented Mar. 15, 1960

2,928,741

PROCESS FOR THE PRODUCTION OF FRUIT WINES

Rhys Wykeham Arengo-Jones, Dorval, Quebec, Canada

Application September 26, 1956, Serial No. 612,225

5 Claims. (Cl. 99—35)

This invention relates to a process for the production of fruit wines other than grape wines and particularly relates to the production of cider, apple cider and sparkling cider although the process as hereinafter set forth can be equally well applied to the production of wines from other fruits, such as pears, cherries, etc. and is not restricted to the use of apples or so-called "cider" apples.

Cider and sparkling cider have been manufactured in European countries for many centuries. The apples used in Europe for the making of cider are, for the most part, of varieties that have been selected and are specially cultivated for the manufacture of cider. These being commonly known as cider apples under such names as Bitter Sweets, Normans, etc. They differ from dessert and culinary apples in that they generally contain more astringency and less acidity. Cider made from them appeals to the popular taste of European people and it is made by a comparatively simple process involving little more than straight fermentation, ageing and blending. This European cider is quite stable in bottle though, as a general rule, some sedimentation will appear in time unless the cider has been aged for a long period of time prior to bottling.

I have found that the European methods of cider making cannot successfully be applied to the apples of North America. European cider-apples grown in North America have been found to lose some of their qualities and to become similar to the common dessert or culinary apples of North America in their reaction to European cider-making techniques.

It is generally well known and my researches have confirmed that cider made from North American grown apples by European methods or techniques generally lacks stability, is "thin" in type, lacks flavour and varies greatly in quality from year to year. The fermentation is difficult to control and the cider, both during and after fermentation, is extremely subject to bacterial spoilage and physical change.

It is because of the apparent impossibility of making cider by the established European methods that there is no cider industry in North America at this date.

My research work has indicated that the symptoms exhibited by North American apple juice in fermentation are due mainly to the nature of its pectic bodies and to the tannic substances which are generally referred to as the "astringency factor." Whether this condition is due to soil, weather or other influences is not known but it may generally be classed as a physiological phenomenon.

It may be accepted as fact that, to be salable in North America, cider must be of pleasing flavour, free from "off" flavours, free from sedimentation in the bottle, free from "haze" and of constant uniformity.

As the so-called cider apples of Europe cannot be grown satisfactorily in North America, to be made into cider by European practices and methods, it is the object of the present invention to provide a process which can be applied to North America dessert or culinary apples for the production of cider which will have a pleasing flavour, be free from sedimentation in the bottle, free from haze, be of constant uniformity and resistant to deterioration in the final container during a normal period of shelf life.

A further object of the invention is to provide a cider from a base stock which can be blended to give any desired alcoholic content and flavour characteristic.

A further object of the invention is to provide a cider from a base stock having neutral flavour which can be blended with preserved apple juice or concentrates to give any desired level of flavour, acidity and alcoholic content.

A further object of the invention is to provide a base stock cider which can be readily converted into various forms of cider such as champagne type cider, hard cider or sparkling cider.

In the established or conventional methods of cider or wine making, apart from the variety, type or kind of fruit, the desired flavours are produced by the selection of the yeast used, the control of the rate of fermentation and the period and condition of ageing. The flavours produced are the "wine" or "vinous" flavours together with a "softness" and "body" that come from the fermentation and ageing conditions. These processes require a total period from 6 months to several years to produce the desired results. In the case of cider as made in Europe there is considerable variation from year to year dependent upon the composition of the apples. Recognizing that modern merchandizing and advertising techniques in North America require a constantly uniform product, the process I have invented and herein describe is, in sequence and combination of processes, a radical departure from the conventional or recognized methods. My process reduces the complete manufacturing period to approximately one month, it permits the manufacturing of the finished product as a continuous operation throughout the year, it enables seasonal fruit variation to be adjusted so as to produce a constantly uniform product, it provides a fruity-vinous flavour by heat-treating (pasteurizing) a combination of a neutral flavoured alcoholic base with a fresh-fruit flavoured juice, it makes a product with the required softness and body by the incorporation into the blend of stabilized non-fermented juice and it makes a bottled product that will not precipitate insoluble matter since the matter likely to precipitate is removed from the product prior to the bottling.

These and other objects of the invention will be apparent from the following specification setting forth the process of producing apple cider from dessert or culinary apples.

Reference is made to the accompanying flow chart showing the order of the various steps of the process for the production of a stable cider, and is typical of the process used with other fruits and fruit juices as starting products.

As the first step in the production of cider by my process as outlined in the accompanying flow chart I select the apples for processing. These apples must be mature and sound, free from rot and mildew and be of moderate acidity. The apples selected include nearly all varieties of dessert or culinary apples except the so-called "early apples" which, for the most part, are too highly acid. The juice is extracted from the apples by any of the common methods of milling and pressing and the residue is put aside for other uses.

The fresh juice is immediately treated with gelatin and tannin for the reduction of viscosity, the quantity of gelatin used being about 3 oz. together with about 1 oz. of tannic acid per 100 gallons of fresh juice, this being the well known fining process. At the same time, about 1 lb. of a commercial pectin splitting enzyme preparation is added to the fresh juice to hydrolyze and precipitate part of the pectin bodies. Of the commercial enzyme preparations used, these sold under the trade names of "Pectinol" and "Pektizyme" have been found to be satisfactory. If a concentrated form of the pectin splitting enzyme is used, an appropriate equivalent quantity is employed.

I have found that, whereas the enzyme method in the absence of the addition of gelatin-tannin hydrolyzes and precipitates sufficient of the pectin to enable filtration to take place and to permit concentration to high solids without jelling, a cider made with a juice so treated is prone to produce further precipitation in the bottle. The gelatin fining process does not appear to affect the jellying pectin content of the juice but the floc that forms as the result of the gelatin-tannin combination appears to involve certain colloids. A juice that has been treated with both enzyme and gelatin will not form precipitates when subsequently fermented and bottled and pasteurized.

A further advantage that results from the gelatin-tannin treatment is that it precipitates some of the colouring matter which, if not so eliminated, might precipitate in the finished cider after it has stood in the bottle for some time. Immediately following the gelatin-tannin enzyme reaction on the juice as evidenced by the appearance of flocculation, the juice is filtered.

At this stage a part of the filtered fresh juice may be drawn off and be reserved for adding to the base stock in a later step of the process or a separate batch of juice may be prepared as above outlined for this use. This filtered fresh juice may be preserved by any suitable method such as freezing or heat sterilization.

The remaining filtered juice is now concentrated to about 36° Beaumé by boiling at a temperature not exceeding 125° F. in a high vacuum pan, the latter to prevent the development of any scorched or cooked apple flavour. The concentrate thus produced is a free flowing product having a natural flavour and only an insignificant amount of caramelized taste. This concentrate may be stored for twelve months without change provided it is stored in impervious vessels at a temperature not exceeding 45° F. The concentrates from different varieties or blends of apples may be stored separately and retain their individual characteritsics so long as they are not exposed to elevated temperatures. The purpose of using concentrates at this stage of the process is because it permits the subsequent preparation and fermentation of batches of cider at any convenient time and because it permits an accurate blending of the juices prior to the fermentation step regardless of the date of original harvest of the apples.

The above steps in the process may be considered as the preliminary stage in the production of cider, to be followed by the second stage which is the production of the base stock.

The concentrate is now converted into reconstituted juice by adding about six parts of water to one part of the concentrate approximately 0.75 lb. of sugar is added per gallon of the combined concentrate and water to bring the total solids in the mix to about 20 percent. The concentrates used are blended so that the acidity of the batch is about 0.55 percent total titratable acidity expressed as malic acid. The amount of sugar added is sufficient to bring the total alcohol content on the base stock to 10.0 percent by volume more or less, and is dependent upon the type of finished cider it is desired to make. The alcohol content required in the base stock is likely to be governed by certain control regulations over the alcohol content of the final cider allowed for sale and the degree of sweetness and other factors required incident to the final blending. The alcohol content, under certain conditions, may be allowed to go as high as 16%. The prepared blend, prior to fermentation, is known as the "must."

To the must is then added an actively fermenting inoculation of selected yeast, the amount being approximately 5 gallons per 100 gallons of must. The temperature is now adjusted to approximately 70° F. and fermentation is maintained active and is completed within 14 to 16 days. The use of a high temperature, fast-fermenting technique avoids the development of undesirable flavours and fermentation is facilitated by the selection of a suitable yeast strain and fermenting at the highest temperature suitable to that yeast strain. At the end of the fermentation period the specific gravity of the fermented stock should be at or below 1,000.

The fermented stock is immediately filtered and stored for a period of from two to three weeks during which time it loses its fermentation or yeast flavour and, while it has a slight "winey" character it is largely neutral both in flavour and odour. This, then I term the base stock or the neutral base stock.

The third stage in the process is blending of the neutral base stock with a non-fermented juice fraction to provide the sweetness and flavour level preferred and to reduce the alcohol content to the percentage desired. If a cider testing 6% alcohol is required and the base stock contains 10% alcohol it will be necessary to add 4 parts of non-fermented juice to each 6 parts of the base stock. The non-fermented juice fraction for this purpose is made from juice prepared during the early stages of the process as shown at B in the flow chart. This juice may have been preserved either by heat or cold, but in either case it should be gelatin fined and filtered prior to sterilization or cold storaging. Alternatively a preserved fresh juice may be used which has been prepared from a separate lot of fruit or in another area, as shown at A in the flow chart. Alternatively, a fresh juice equivalent may be prepared by reconstituting concentrate and adding to it the natural volatile flavouring constituents that may be stripped from fresh juice prior to concentration as shown at C in the flow chart. Again, preserved fresh juice blended with reconstituted concentrate may be used such as a combination of A, B and C shown in the flow chart. By adjustments in this blend and by using preserved juice from selected varieties, it is evident that special flavour characteristics may be obtained.

The proportions of the non-fermented juice fractions in the blend may vary dependent upon the type of cider required but it is obvious that as the base stock is neutral a wide latitude of blending of the non-alcoholic material is permissible before adding to the base stock. By blending six parts of base stock having a 10 percent alcoholic content with four parts of non-alcoholic juice, a product is obtained containing 6 percent alcohol by volume. The alcoholic content of the final product may be varied depending upon the factors governing the control and sale of the final product. For instance cider may be required to have a low alcoholic content while fruit wines may have a relatively high alcoholic content, very little less than that of the base stock. The proportion of non-alcoholic material may be increased or decreased to vary the final alcoholic material content without disturbing the stability of the final cider, the flavour, type and quantity of the non-alcoholic juice and the alcoholic content of the base stock being adjusted to make the desired end product.

The bottling stock as above blended is immediately filtered and, if sparkling cider is desired it is conveniently impregnated with about two volumes of carbon dioxide gas under pressure. Bottle filling and capping are then carried out by well established methods. The bottled cider is then immediately pasteurized. I have found that pasteurization carried out at about 145° F. not only destroys any micro organisms remaining in the cider but brings about an amelioration and development of flavour due, probably, to heat-induced chemical reactions. The optimum temperature at which the bottled cider is pasteurized will vary slightly according to the pH value of the cider, but at pH 3.4 the temperature required is about 145° F.

The formula for the above described process for the production of cider can be more clearly expressed by the following examples read in conjunction with the flow chart.

Example 1

To produce 6% alcohol content cider:

| | | |
|---|---|---|
| Fresh juice | gals | 100 |
| Gelatin-tannin | ozs | 4 |
| Pectin splitting enzymes | lb | 1 |
| Sugar | lbs | 75 |
| Yeast culture | gals | 5 |

=Base stock—10% alcohol content.

To 60 gals. of base stock add

| | | |
|---|---|---|
| Preserved fresh juice | gals | 20 |
| Concentrated juice | gals | 3 |
| Water | gals | 17 |

Example 2

To produce 6% alcohol content sparkling cider:

| | | |
|---|---|---|
| Fresh juice | gals | 100 |
| Gelatin-tannin | ozs | 4 |
| Pectin splitting enzymes | lb | 1 |
| Sugar | lbs | 75 |
| Yeast culture | gals | 5 |

=Base stock—10% alcohol content.

To 60 gals. of base stock add

| | | |
|---|---|---|
| Preserved fresh juice | gals | 20 |
| Concentrated juice | gals | 3 |
| Water | gals | 17 |
| Carbond dioxide | volumes | 2 |

Example 3

To produce 5% alcohol content cider:

| | | |
|---|---|---|
| Fresh juice | gals | 100 |
| Gelatin-tannin | ozs | 4 |
| Pectin splitting enzymes | lb | 1 |
| Sugar | lbs | 75 |
| Yeast culture | gals | 5 |

=Base stock—10% alcohol content.

To 50 gals. of base stock add

| | | |
|---|---|---|
| Preserved fresh juice | gals | 25 |
| Concentrated juice | gals | 3.75 |
| Water | gals | 21.25 |

Example 4

To produce 6% alcohol content cider:

| | | |
|---|---|---|
| Fresh juice | gals | 100 |
| Gelatin-tannin | ozs | 4 |
| Pectin splitting enzymes | lb | 1 |
| Sugar | lbs | 75 |
| Yeast culture | gals | 5 |

=Base stock—10% alcohol content.

To 60 gals. of base stock add

| | | |
|---|---|---|
| Concentrated juice (blended) | gals | 5.8 |
| Water | gals | 34.2 |

The above description describes the process as applied to the making of cider from dessert and culinary apples and results in a final product which is stable in the bottled state over long periods of time; which can be held to a uniform concentration of alcoholic content and uniform flavour level due to the fact that the original juice is first concentrated and is then reconstituted as a juice and fermented to produce a neutral base stock. Once the neutral base stock has been produced having a predetermined alcoholic level, the final blend can be controlled with absolute accuracy both as to flavour level and alcoholic content. Such accuracy and uniformity cannot be attained in cider made by directly fermenting fruit juice.

While the process described has been drawn to cover the production of apple cider, it will be realized that the process can be applied to the making of all types of fruit wines except for grape wines. For instance "perry" can be produced from the pressed juice of pears and other wines can be made from such fruits as plums, cherries and all types of berries such as loganberries, blackberries, strawberries, etc. with the certainty that the end product will be uniform in all respects and not subject to the natural changes in the crop from year to year. It is therefore, to be understood that throughout the appended claims the expression "pressed juice" and "preserved juice" and "concentrate" are not to be limited to the products of apples but are intended to cover all other fruits except grapes, and the weights and volumes quoted may be varied within a wide range to make ciders and wines of different alcohol contents and of various flavours.

What I claim is:

1. A method for making cider comprising the steps of expressing the juice from the fruit, filtering the expressed juice, concentrating a first portion of the filtered juice, fast fermenting said first portion at an elevated temperature to produce a neutral-flavored alcoholic base stock, and blending said neutral-flavored alcoholic base stock with a second portion of the filtered juice.

2. A process for producing cider and wines from fruits comprising extracting the juice from the fruit and fining the extracted juice with gelatin-tannin and depectinating with a pectin splitting enzyme and filtering the juice thus treated, concentrating the filtered juice to a relatively high solids content, adding water, sugar and yeast to a portion of the filtered concentrated juice and fast fermenting at an elevated temperature said portion of the concentrated juice and filtering the fermented stock thus formed to make a neutral-flavored alcoholic base stock, and blending with the alcoholic base stock a predetermined quantity of non-fermented filtered juice.

3. A process according to claim 2 including the further step of pasteuring the blended base stock and juice.

4. A process according to claim 2 wherein the base stock is aged prior to blending until the base stock is neutral as to flavor and odour and has an alcohol content between 5 and 16%.

5. A process for producing cider and wines from fruits comprising extracting the juice from the fruit, fining the extracted juice with gelatin-tannin, depectinating with a pectin splitting enzyme, filtering the juice thus treated, concentrating the filtered juice to a relatively high solids content, adding water, sugar and yeast to the filtered concentrated juice, fast fermenting the concentrated juice at about 70° F., filtering the fermented stock thus formed to make a neutral-flavored alcoholic base stock, blending with the alcoholic base stock a predetermined quantity of non-fermented filtered juice, and pasteurizing the blended base stock and juice.

References Cited in the file of this patent

UNITED STATES PATENTS 1,027,336   Holldampf _____ May 21, 1912

OTHER REFERENCES

The Chemistry and Technology of Fruit and Vegetable Juice Production, by D. K. Tressler and M. A. Joslyn. Copyright 1954 by the Avi Pub. Co., Inc., New York, pp. 239, 240, 531 to 536, 553.